United States Patent [19]

Guinn et al.

[11] Patent Number: 4,637,406

[45] Date of Patent: Jan. 20, 1987

[54] CHAFF AND STRAW SPREADING ATTACHMENT FOR COMBINES

[75] Inventors: Ronald K. Guinn, Valley Center; Ferol S. Fell, Newton, both of Kans.

[73] Assignee: Hesston Corporation, Hesston, Kans.

[21] Appl. No.: 639,251

[22] Filed: Aug. 9, 1984

[51] Int. Cl.⁴ ............................................. A01F 29/02
[52] U.S. Cl. ............................ 130/27 R; 130/27 HF; 56/14.6; 416/178; 241/101.7
[58] Field of Search .............. 130/27 R, 27 HF, 27 H, 130/27 Z; 416/178; 241/101.7; 56/14.6

[56] References Cited

U.S. PATENT DOCUMENTS

| | | | |
|---|---|---|---|
| 754,448 | 3/1904 | Henry | 406/71 |
| 1,021,917 | 4/1912 | Cooper | |
| 3,317,064 | 5/1967 | Fingernut | |
| 3,450,286 | 6/1969 | Tessman | 130/27 R |
| 3,469,773 | 9/1969 | Pool | |
| 3,664,349 | 5/1972 | Quick | 130/27 HF |
| 3,669,123 | 6/1972 | Gaeddert | 130/27 R |
| 3,800,804 | 4/1974 | Boone | 130/27 HF |
| 3,816,023 | 6/1974 | Shaver | 416/178 |
| 4,007,999 | 2/1977 | Serizawa | 416/178 |
| 4,056,107 | 11/1977 | Todd et al. | 130/27 T |
| 4,198,802 | 4/1980 | Hengen et al. | 130/27 T |

FOREIGN PATENT DOCUMENTS

| | | | |
|---|---|---|---|
| 2815936 | 10/1979 | Fed. Rep. of Germany | 130/27 R |
| 240375 | 8/1969 | U.S.S.R. | 130/27 HF |

OTHER PUBLICATIONS

Brochure: "Straw Storm Returns Trash to All Your Land", Keith Industries, Inc.; Winnipeg, Canada.
Brochure: "Love Chaff Spreader"; J. E. Love Company; Code 8G-4/81-R.

Primary Examiner—Gene Mancene
Assistant Examiner—David I. Tarnoff
Attorney, Agent, or Firm—Schmidt, Johnson, Hovey & Williams

[57] ABSTRACT

The discharge hood of an agricultural combine has a housing suspended from the bottom thereof in disposition for receiving straw from straw walkers of the combine into a rotary chopper which impacts the straw and propels it rearwardly out through a spreader, while at the same time creating a current of air flowing through the housing. A second inlet positioned forwardly adjacent the straw inlet of the housing is located to receive a stream of chaff from a forwardly disposed chaff discharge of the combine so that both the chaff and the straw are passed through the chopper, admixed into a single stream, and propelled upwardly and rearwardly from the combine to be strewn and scattered across the ground behind the advancing machine. A booster fan adjacent the chaff discharge augments the air suction created at the chaff inlet of the housing by the high-speed chopping rotor to assure conveyance of the light chaff particles across the free space between the chaff just discharged and the chopper housing.

10 Claims, 8 Drawing Figures

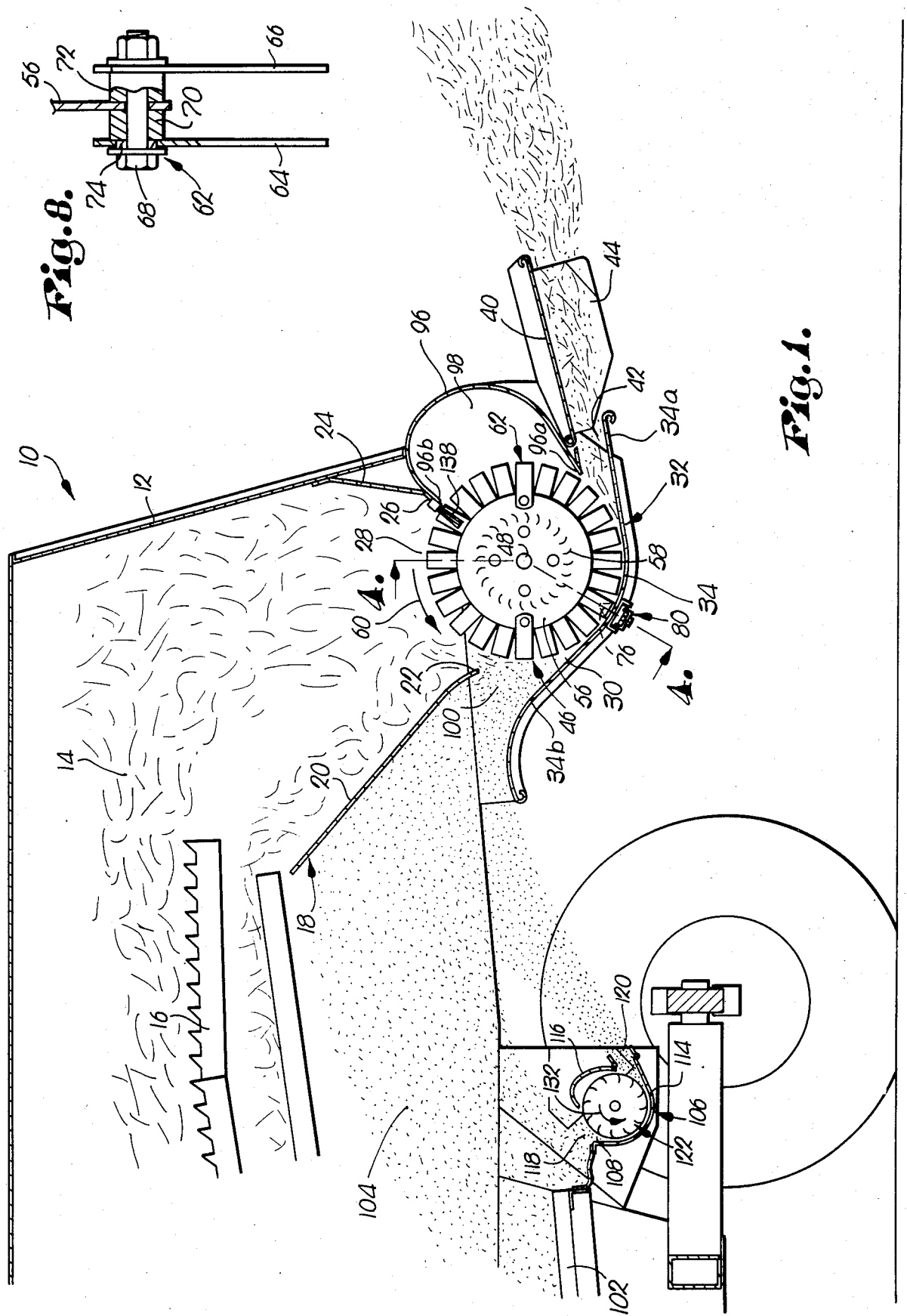

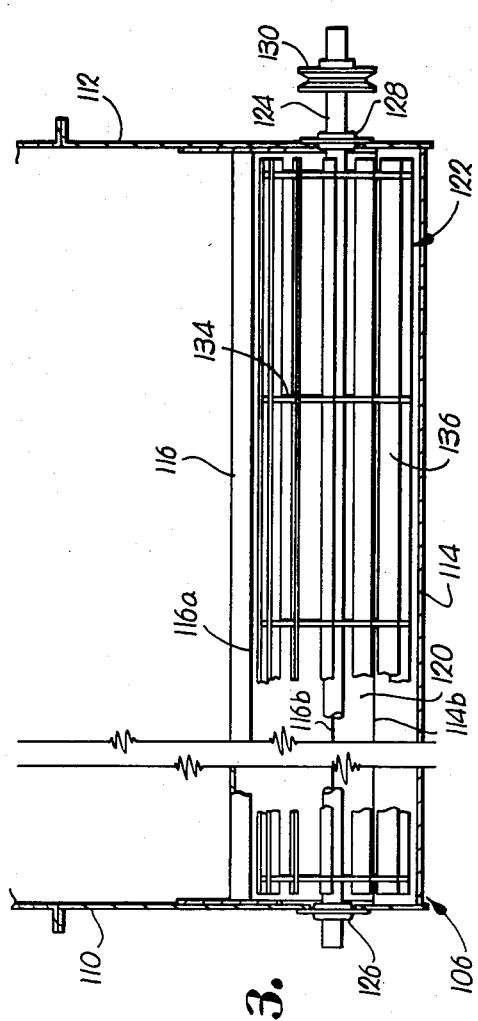
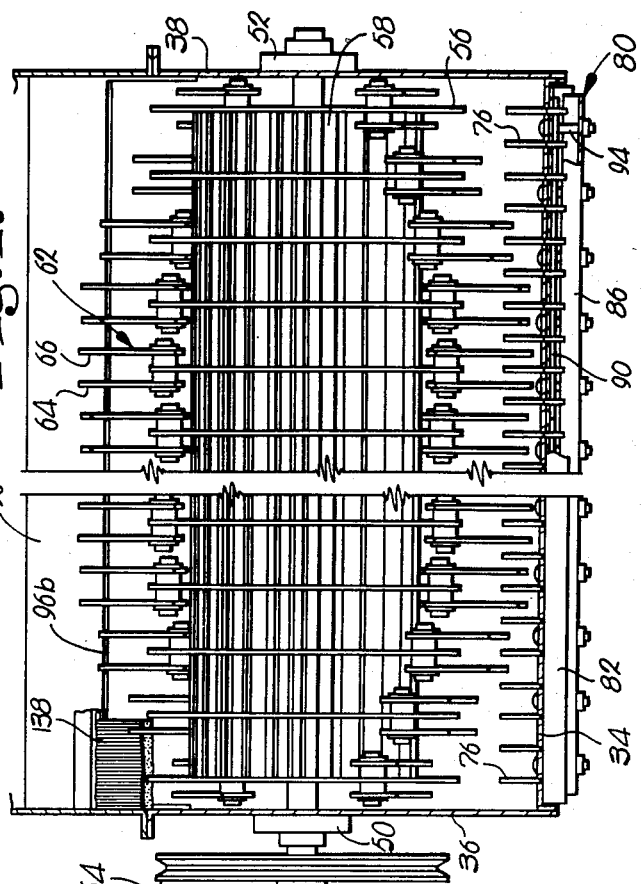
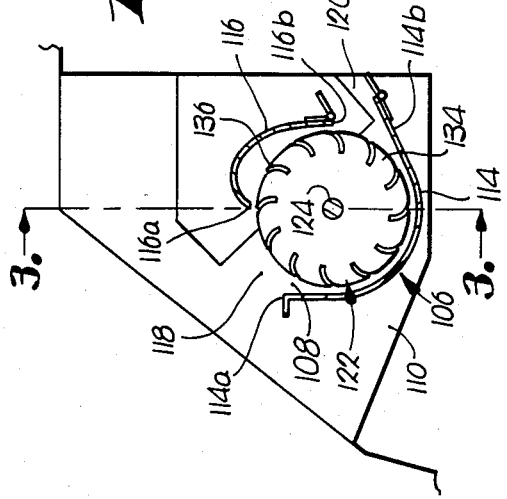

4,637,406

CHAFF AND STRAW SPREADING ATTACHMENT FOR COMBINES

TECHNICAL FIELD

This invention relates to the field of residue handling from crop combine machines and, more particularly, to an attachment for such combines which enables both straw and chaff residue to be merged into a common stream from their separate discharge sources and passed collectively through a single chopper and spreader mechanism therefor.

BACKGROUND

While it has been popular for some years to attach straw choppers to the residue discharge hoods of combines in order to comminute and spread straw residue emanating from internal threshing mechanism of such machines, little has been done with respect the chaff particles discharged from a separate source in the combine. In this respect, such chaff has commonly been left to simply gravitate onto the ground without any particular control or directive influence thereover such that a virtual windrow of concentrated chaff particles has sometimes resulted, although some attempts have been made to collect the chaff and spread it more evenly across the field. A heavy concentration of chaff covering the soil has the deleterious effect of robbing the soil of its valuable nutrients, and thus it is important that even the chaff residue be handled in an appropriate manner.

SUMMARY OF THE PRESENT INVENTION

Accordingly, one important object of the present invention is to provide a way of passing both the chaff and straw residue through a common chopper and spreader so that the two different types of materials are thoroughly admixed and evenly spread out across the ground behind the advancing machine, even though the straw and chaff originate from two separate discharge sources remotely spaced from one another within the combine.

To this end, an attachment according to the principles of the present invention is suspended beneath the discharge hood of a combine in disposition to receive straw residue through a first upper inlet and direct the same through the highspeed chopping rotor of the attachment for fragmentation thereby and propulsion out through the spreader fins of the attachment for dissemination. Such rotation of the rotor is utilized to induce a secondary air stream entering the chopper through a second inlet adjacent the straw inlet thereof and in position for receiving chaff from the forwardly located chaff discharge area of the machine. Both entering streams of materials are admixed and blended within the chopper by the spinning rotor and are jointly and collectively propelled rearwardly through the spreader fins of the attachment for uniform distribution and dissemination across the field. A booster fan at the chaff discharge point in the combine helps make the chaff particles airborne and propels them in the direction of the chopper housing where they are drawn in by relatively low pressure suction existing at the chaff inlet of the chopper housing to be processed through the chopper. Special curvilinear walls associated with each of the spinning rotary devices helps assure that air slipping past the discharge outlets thereof is redirected back into the spinning rotors before having an opportunity to flow reversely back out through the materials inlets of the rotors, thereby avoiding unstable air current conditions at such inlets which would tend to mitigate their suction effects.

BRIEF DESCRIPTION OF THE DRAWINGS

FIG. 1 is a fragmentary vertical cross-sectional view through the rear of a typical combine showing apparatus constructed in accordance with the present invention attached thereto;

FIG. 2 is an enlarged, fragmentary, vertical cross-sectional view of a booster fan and its associated housing structure used at the chaff discharge of the combine;

FIG. 3 is a fragmentary cross-sectional view thereof taken substantially along line 3—3 of FIG. 2;

FIG. 4 is a fragmentary cross-sectional view of the primary chopper attachment taken substantially along line 4—4 of FIG. 1;

FIG. 5 is an enlarged, fragmentary end elevational view of mounting structure associated with the concaves or knives which cooperate with hammers of the chopping rotor;

FIG. 6 is a fragmentary side elevational view thereof;

FIG. 7 is a fragmentary, bottom plan view thereof with parts broken away for clarity; and FIG. 8 is an enlarged, fragmentary detail view partially in cross-section and partially in elevation illustrating details of the hammer construction associated with the chopping rotor of the attachment.

DETAILED DESCRIPTION

The combine 10 illustrated fragmentarily in FIG. 1 has a rearmost discharge hood 12 within which straw residue 14 emanates from straw walkers 16 of the combine. The straw 14 gravitates downwardly through the hood 12 to an open bottom hopper denoted broadly by the numeral 18 and having as one of its major components a flat, inclined front wall 20 which spans the hood 12 from side-to-side thereof and has a lowermost edge extremity 22. A second major component of the hopper 18 is a rear wall 24 spaced rearwardly from front wall 20, spanning the hood 12 from side-to-side thereof, and having a lowermost extremity 26. The two extremities 22 and 26 of walls 20, 24 respectively terminate adjacent the lower open bottom of the hood 12 and serve to define therebetween an inlet 28 to the chamber 30 of an open-top chopper housing 32 attached to the hood 10 and suspended beneath the latter.

The housing 32 has a generally concave bottom 34 spaced below the inlet 28 which cooperates with a pair of opposite sidewalls 36 and 38 (FIG. 4) to define the interior chamber 30. The lower, rearmost portion 34a is flat and projects upwardly and rearwardly to a slight degree for cooperation with a panel 40 spaced vertically above the portion 34a and likewise extending upwardly and rearwardly to define an outlet 42 from the chamber 30. Outlet 42 extends across the full width of the housing 32 and panel 40 is provided with a series of downwardly protruding spreader fins 44 which are spaced apart along the transverse width of the outlet 42 as well understood by those skilled in the art.

Within the chamber 30 is disposed a chopping rotor 46 having a central transversely extending shaft 48 journalled by a pair of opposite bearings 50 and 52 in the sidewalls 36, 38 respectively. As illustrated in FIG. 4, a sheave 54 fixed to the shaft 48 at one outboard end thereof is adapted to receive driving power from an endless belt (not shown) for spinning the rotor 46 about the axis of shaft 48.

As perhaps best shown in FIG. 4, the rotor 46 also includes a series of circular bulkhead plates 56 of identical diameters spaced along and rigidly affixed to the shaft 48 between the opposite sidewalls 36, 38. A circumferential series of elongated, continuous, transversely cupper fins 58 are supported by the plates 56 in a circular arrangement having a diameter which is less than that of the outer diameter of the plates 56 (see FIG. 1). Each of the fins 58 extends substantially the full length of the rotor 46, passing through and suitably secured in place within the series of plates 56. The somewhat C-shaped fins 58 are so arranged that their concave faces are leading when the rotor 46 is rotated in a counterclockwise direction viewing FIG. 1 as indicated by the arrow 60.

Each of the plates 56 also carries a pair of diametrically opposed hammer assemblies broadly denoted by the numeral 62 and shown in detail in FIG. 8. The assemblies 62 are staggered circumferentially and in a helical pattern along the length of the rotor 46 for most efficient action as will hereinafter be described, and each of the assemblies 62 includes a pair of rectangular, free-swinging flail hammers 64, 66 pivoted to opposite sides of the corresponding bulkhead plate 56 by a bolt 68. Each assembly 62 further includes a pair of spacers 70 and 72 on the bolt 68 on opposite sides of the plate 56 maintaining the corresponding hammers 64, 66 spaced outwardly from the opposite surfaces of the plate 56, and each of the hammers 64, 66 is provided with a bushing 74 journaling the same on the bolt 68.

The rotor 46 cooperates with a series of concaves or knives 76 projecting upwardly into the chamber 30 from the bottom 34 and interspersed between adjacent ones of the hammers 64, 66. The concaves 76 are of generally triangular configuration and project upwardly through clearance slots 78 in the bottom 34 from a common mounting bracket assembly 80 situated below bottom 34 and extending transversely across the full width thereof. Bracket assembly 80 includes an inverted, generally U-shaped channel 82 having a series of clearance slits 84 corresponding in number and position to the concaves 76 and through which the concaves 76 project. A second transversely U-shaped but smaller channel 86 of the bracket assembly 80 is transversely notched at 88 to receive the proximal ends of the concaves 76 and retain the latter against lateral displacement. A pair of retaining rods 90 and 92 pass through perforations in the concaves 76 beneath a top web 82a of the channel 82 so as to limit upward projection of the concaves 76, while a series of carriage bolts 94 along the length of the bracket assembly 80 not only attach the latter to the bottom 34 but also draw the channel 86 tightly against the bottom edges of the concaves 76 in notches 88 to retain the concaves 76 against downward movement out of the chamber 30.

The chopper housing 32 is also provided with a special air return wall denoted by the numeral 96 of generally volute, curvilinear configuration located between the outlet 42 and the inlet 28 on the downstream side of outlet 42 with respect to the normal direction of rotation of the rotor 46. The wall 96 spans the two sidewalls 36, 38 and has a first edge extremity 96a disposed immediately adjacent the outlet 42 and in close proximity to the periphery of the rotor 46 as defined by the outer tips of hammer assemblies 62 during highspeed rotation of the rotor 46. As illustrated in FIG. 1, the wall 96 initially extends generally upwardly and rearwardly away from the rotor 46 in a direction which is generally tangential to the lower portion of the latter and thereupon curves upwardly for a distance before returning inwardly toward the rotor 46 in a generally radial direction, terminating in a upper edge extremity 96b closely adjacent the periphery of rotor 46 and immediately alongside of the lower extremity 26 of hopper back wall 24. The curved wall 96 thus provides an air return subchamber 98 within which any air slipping past the outlet 42 during rotation of the rotor 46 may be guided along the wall 96 and redirected back into the rotor 46 before reaching the inlet 28.

The bottom 34 of the housing 32 has a forward portion 34b thereof which curves upwardly and forwardly from the vicinity of the concaves 76 to a position within the vertical plane of edge extremity 22 of front hopper wall 20, and then forwardly beyond such plane spaced at a distance below such edge 22, thereby to define a second inlet 100 to the chamber 30. The portion 34b also curves rearwardly and downwardly after reaching its apex at a point forwardly of the edge 22 so as to present a flared mouth effect with respect to the opposed hopper wall 20.

The combine 10 has shaker table mechanism 102 located substantially below the straw walkers 16 and considerably forward of the housing 32. Such tables 102 represent a point of discharge for chaff 104 within the combine 10.

A second housing 106 rearwardly adjacent the shaker tables 102 has an internal chamber 108 defined partially by a pair of opposite sidewalls 110 and 112 (FIG. 3), and by a bottom wrapper 114 of generally concave configuration spanning the distance between the two sidewalls 110, 112. A top wall 116 spaced above the bottom wrapper 114 and spanning the two sidewalls 110, 112 also cooperates to define the internal chamber 108 and has a generally volute configuration similar to the wall 96 associated with housing 32 for similar purposes. The upper edge extremity 116a of top wall 116 cooperates with the forwardly spaced upper edge extremity 114a of wrapper 114 to define a chaff inlet 118 to the chamber 108, while a lower terminal edge extremity 116b of top wall 116 cooperates with a spaced, flat lower portion 114b of the wrapper 114 to define a chaff outlet 120 from the chamber 108.

Within the chamber 108 is disposed a rotary impeller fan 122 having a central drive shaft 124 spanning the sidewalls 110, 112 and journalled therein by bearings 126 and 128. A sheave 130 on one outer end of the shaft 124 may be coupled with an endless belt (not shown) for supplying driving power to the shaft 124 in order to rotate the fan impeller 122 in a counterclockwise direction as indicated by the arrow 132 in FIG. 1. A plurality of circular bulkhead plates 134 of identical diameter are spaced along the shaft 124 and are fixed thereto for rotation therewith, such plates 134 in turn supporting elongated, continuous, transversely cupped fins 136 similar to those utilized in conjunction with the rotor 46. As illustrated particularly in FIG. 2, the cupped sides of the fins 136 are oriented in a leading disposition with respect to the direction of rotation of impeller 122.

OPERATION

As the combine 10 advances across the field, straw residue 14 and chaff 104 from the walkers 16 and tables 102 enter the hopper 18 and becomes entrained in a current of air flowing through the inlet 28, chamber 30, and outlet 42 as a result of spinning of the fins 50. As the straw actually passes through the chamber 30, it is aggressively impacted and fractured by the hammers 64, 66 working in conjunction with the concaves 76 so as to be reduced to small particles and projected rearwardly in a stream through the spreaders 44.

At the same time, some of the chaff particles 104 emanating from the shaker tables 102 enter the housing 106, partly by gravitation, partly as a result of a positive air stream directed rearwardly across the shaker tables 102 from a source (not shown) in a forward location of the combine, and partly due to a current of air that is induced by the impeller fan 122 rotating within chamber 108. Passing into the inlet 118, such chaff residue is primarily carried by the air current around the outer periphery of the impeller fan 122 and along the surface of the underlying wrapper 114 for ejection from chamber 108 via the outlet 120. At this point, a combination of the positive pressure airstream departing from the booster fan outlet 120 and the suction created by the chopping rotor 46 at the inlet 100 causes the airborne chaff particles to traverse the empty space between housing 106 and housing 32 and enter inlet 100 as illustrated in FIG. 1. There the arriving stream of chaff is pulled down into the chamber 30 and immediately admixed with the straw residue being acted upon by rotor 46 such that the stream of materials then issuing from the outlet 42 constitutes a well mixed and blended admixture of both chaff and straw particles. Such admixture is directed upwardly and rearwardly to a slight extent and is at the same time dispersed laterally in opposite directions by the spreader fins 40 such as to be strewn evenly over the surface of the soil behind the advancing combine 10, aided to a certain extent in this respect by any prevailing ambient winds.

It has been found to be important in achieving optimum performance of the impeller fan 122 and chopping rotor 46 to utilize the special air-directing walls 116 and 96 respectively. In this regard, it is believed that without the presence of such walls, there is a tendency for the airstream induced and flowing through the chambers 30 and 108 to fail to be fully stripped from the respective rotors 32 and 122 as the latter spin at high speeds and to be pulled on around and back out the respective inlets 28 and 118, at least to some extent. With the redirecting walls 96 and 16 in place, however, it has been found that any air tending to follow the spinning rotors on around in their revolutions will tend to be redirected back down into such rotors before reaching the inlets 28 and 118 and having a counterproductive action at such locations.

In this regard, it has also been found beneficial to provide the edge extremity 96b of wall 96 with a brush 138 or the like which tends to make an air-impervious seal at that location with the periphery of the spinning rotor 46. The brush 138 is provided with flexible bristles through which hammers 64 pass during rotation of the rotor 46, and operates to inpede the flow of air from the chamber 98, past the edge 96b and into the hood 12.

It is not intended from the above to indicate that all the chaff 104 gravitates through the inlet 118, for, indeed, the bulk of the chaff flows directly to the rotor 46 via inlet 100, induced to a great extent by the fins 58. However, most of the chaff which otherwise falls to the ground is captured by the housing 106 and admixes with the chaff 104 and the straw 14 flowing from the walkers 14 and the tables 102 directly to the housing 32.

The importance of the fins 58 cannot be overemphasized. They operate not only to effectively draw the straw 14 and the chaff 104 (especially the latter) into the housing 32 but cooperate with the fins 44 to spread and propel the output of the chopper not only widely in both directions but at much greater distances than has heretofore been possible with conventional choppers. As a result, all such output is dispersed evenly and somewhat thinly over a large ground area.

We claim:

1. In combination with an agricultural combine having a rearmost discharge for straw residue and a separate forwardly positioned discharge for chaff, apparatus for joining the discharged straw and chaff into a single stream and spreading the same behind the combine as the latter advances across a field, said apparatus comprising:

a housing attached to said straw discharge and having an internal chamber, said chamber being provided with a straw inlet and an outlet at opposite portions thereof;

a rotor located within said chamber between said inlet and outlet having an axis of rotation transverse to the path of travel of materials therethrough, said rotor having means thereon capable of impacting materials passing through the rotor during rotation of the latter and of creating a stream of air flowing through the chamber and out said outlet to entrain materials therein, said housing being provided with a second inlet to said chamber adjacent said straw inlet and remote from said outlet for receiving chaff from said chaff discharge and directing the same into said chamber for admixture with the straw, movement through the rotor, and entrainment in the stream flowing out said outlet;

spreader means associated with said outlet in disposition for impinging the entrained materials issuing from said housing and dispersing the same laterally behind the advancing combine;

a booster impeller adjacent said chaff discharge for producing a chaff-entraining current of air flowing to said chaff inlet of the rotor housing;

an impeller housing about said impeller and provided with an outlet spaced from and oriented toward said chaff inlet of the rotor housing whereby to direct the air current to the rotor housing; and an open transfer space defined between the outlet of the impeller housing and the chaff inlet of the rotor housing, said open transfer space being exposed to the chaff discharge and said outlet of the impeller housing being physically separate from and unattached to the chaff inlet of the rotor housing whereby the air current moving through said transfer space and exposed to the chaff discharge may entrain the chaff and carry the same into the rotor housing.

2. In the combination as claimed in claim 1, wherein said impeller comprises an elongated rotary fan capable of receiving air along the length thereof and forcing the same toward said chaff inlet.

3. In the combination as claimed in claim 2, wherein said fan is provided with air return means adjacent said outlet of the impeller housing on the downstream side thereof with respect to the direction of rotation of the fan, said return means including a curvilinear wall leading generally upwardly away from the fan and thence back toward the latter at a point downstream therefrom with respect to the direction of rotation of the fan.

4. In the combination as claimed in claim 1, wherein is provided a straw-receiving hopper on the upstream side of said chamber having a pair of fore-and-aft spaced, relatively downwardly converging walls defining said straw inlet therebetween at their lower extremities, said housing having a generally concave bottom spaced below said hopper and cooperating with said extreimty of the front wall thereof to define said chaff inlet.

5. In the combination as claimed in claim 4, wherein said bottom of the housing includes a forward portion thereof curving upwardly and forwardly to the vertical plane of said extremity of the front wall and then forwardly beyond said front wall extremity toward said chaff discharge.

6. In the combination as claimed in claim 5, wherein said forward portion of the bottom includes a downwardly and forwardly curved forwardmost margin flaring away from said front wall of the hopper to facilitate reception of chaff into the chamber from the chaff discharge.

7. In the combination as claimed in claim 1, wherein said rotor housing further includes structure between said outlet and the straw inlet on the trailing side of the outlet with respect to the direction of rotation of the rotor for redirecting air which has bypassed the outlet back into the rotor, said structure including a curvilinear guide wall leading generally upwardly and rearwardly away from said outlet initially generally tangentially with the rotor and then curving back forwardly and downwardly toward the rotor at a point adjacent said straw inlet.

8. The invention of claim 1, said means for creating a stream of air being a fan mounted within the rotor for rotation therewith, said fan including a series of elongated, transversely cupped fins spaced radially inwardly from the outer periphery of the rotor, extending parallel to the axis of rotation of the rotor, and arranged in a circular pattern about said axis.

9. The invention of claim 7; and a brush extending along said guide wall adjacent the rotor for providing an air seal at said point.

10. The invention of claim 9, said rotor having impacting hammers, said brush having flexible bristles engaged by the hammers during rotation of the rotor.

* * * * *